United States Patent [19]

DePetris et al.

[11] Patent Number: 5,154,968
[45] Date of Patent: Oct. 13, 1992

[54] MOLDED DIMENSIONAL PRODUCT MADE FROM FIBROUS MATERIALS

[75] Inventors: Robert DePetris, Chatsworth; William Reeve, Burlington, both of N.J.

[73] Assignee: Leucadia, Inc., La Jolla, Calif.

[21] Appl. No.: 623,284

[22] Filed: Dec. 5, 1990

[51] Int. Cl.⁵ .............................. D04H 1/70
[52] U.S. Cl. .............................. 428/283; 264/118; 264/119; 264/122; 428/284; 428/288; 428/326; 428/402; 428/289
[58] Field of Search ............... 264/115, 116, 119, 122, 264/118, 121; 428/283, 284, 402, 326, 289, 288

[56] References Cited

U.S. PATENT DOCUMENTS

| | | | |
|---|---|---|---|
| 2,662,576 | 12/1953 | Pukacz | 264/121 |
| 2,757,148 | 7/1956 | Heritage et al. | 260/17.2 |
| 2,757,150 | 7/1956 | Heritage et al. | 260/17.2 |
| 2,759,837 | 8/1956 | Roberts | 264/115 |
| 3,287,479 | 11/1966 | Naudain | 264/122 |
| 3,671,615 | 6/1972 | Price | 264/122 |
| 3,914,498 | 10/1975 | Videen | 428/290 |
| 3,928,693 | 12/1975 | Rudloff | 264/122 |
| 3,940,466 | 2/1976 | Evers et al. | 264/115 |

FOREIGN PATENT DOCUMENTS 2135673 9/1984 United Kingdom ............... 264/122

OTHER PUBLICATIONS

WO88/09406 Dec. 1, 1988.

Primary Examiner—Mary Lynn Theisen
Attorney, Agent, or Firm—Lucas & Just

[57] ABSTRACT

A molded product is made having uniform strength throughout the product. The molded product is made by mixing together fibrous materials such as cellulosic fibers and a heat-fusible binding agent such as a phenolic resin to form an admixture. The admixture is then sprayed with a binding agent such as starch as it is dispersed to form a fibrous molding preform. Heat and pressure are applied to the molding preform to form a molded product.

16 Claims, 2 Drawing Sheets

MOLDED DIMENSIONAL PRODUCT MADE FROM FIBROUS MATERIALS

The present invention relates to molded products made of fibrous materials and, in particular, to a molded dimensional product having uniform strength and appearance which is made from fibrous materials.

It is known to combine fibrous materials with bonding materials to produce a fibrous molding preform, which may then be molded by applying heat and/or pressure. Bonding materials included in such products are a thermoplastic binder such as starch to form an intermediate molding preform such as a blanket product, and a thermoset binder such as a phenolic resin to bond the molded product. The problem in the past has been that the molded products have non-uniform strength throughout the product, i.e. there are areas in the product where the product is susceptible to breakage or where blistering or warping occurs The increased tendency towards breakage, blistering and warping is believed to be due to a non-uniform distribution of the thermoset agent in the fibrous material It is thought that this may arise because the thermoset agent does not become uniformly incorporated throughout the materials. If the thermoset agent is deposited on the surface of the fibrous materials, the thermoset agent may simply rest on top of the fibrous materials or, under agitation, it may settle through to the bottom of the mass of fibrous material, without properly dispersing throughout the fibrous mass. Thus, after the molding preform is made, there are areas therein having less thermoset binder as compared with the rest of the product, or, in some instances, no thermoset binder at all. These areas of lower thermoset binder density have been found to be the areas where the tendency to break is greater after the fibrous preform has been molded into its finished form.

The present invention overcomes these prior art difficulties by making a molded dimensional product from a molding preform which has the thermoset agent substantially uniformly distributed throughout the molding preform. The molding preform is made by first mixing dry particles of a heat-fusible thermoset binding agent with the fibrous materials. In a second step, an aqueous solution of a thermoplastic binding agent is sprayed onto the admixture of fibrous materials and thermoset binding agent as the mixture is being ejected under pressure from an orifice into a free-fall state. The molding preform is made by gravity deposition of the free-falling fibers and thermoset binder, each of which has been treated with the thermoplastic binder. The molding preform, suitably a blanket, is dried, cut to a suitable dimension, and then molded under heat and pressure to a desired, three-dimensional, end shape. By the term "three-dimensional", it is meant that the product is not planar, such as a sheet or a board, but rather has a non-planar shape such as a bowl or a hat.

The molding preform made in accordance with the present invention has substantially uniform distribution of the heat-fusible thermoset binding agent throughout the fibrous materials. Because of the uniform distribution of the thermoset binding material, the molded product made from the molding preform has a lower tendency towards having weak spots which could break. In addition, it has a uniform appearance with little or no warping or blisters.

Furthermore, there is no need to compress the molding preform of the present invention before molding the final product, which saves processing time and costs.

As used in the specification and claims herein, "molded dimensional product" means a product which is molded into a shape having concavities and/or raised areas. These products are applicable for use as or in a variety of items including, for example, decorative trim panels, automotive headliners, door panels, instrument panels, center trim pillars, package trays, consoles, furniture, luggage, building materials, packaging and the like.

In accordance with the present invention, fibrous materials such as wood fibers, bleachboard, paper, or textile wastes are opened up in conventional manner to a low density, suitably about 1 lb./ft$^3$ (about 16 kg/m$^3$). Conventional means for opening up the fibrous materials include a hammermill or a waste pulling machine. Suitable wood fibers include yellow pine wood fibers. Suitable bleachboard and paper fibers include recycled paper packaging material and sulfite paper pulp. Suitable textile fibers include recycled thread waste. Textile fibers, if used, are preferably of cellulosic origin. Fibrous materials may be from any suitable source. It is only necessary that the fibrous materials used be capable of forming a low density molding preform of about 1 to about 5 lbs./ft$^3$ (about 16 to about 80 kg/m$^3$) which can be compressed by a factor of at least 3 to a final density of about 5 to 75 lbs./ft$^3$ (about 80 to about 1,200 kg/m$^3$) to form the molded product of the present invention.

The fibrous materials are mixed with particles of a dry thermosetting heat-fusible binding agent such as a dry phenolic resin. Any means of mixing together the fibrous materials with the heat-fusible thermoset binding agent may be used as long as the heat-fusible thermoset binding agent is thoroughly mixed with the fibrous materials. Suitable mixing methods include mixing the fibers with the heat-fusible thermoset binding agent in a mixing bin, or spraying the dry heat-fusible thermoset binding agent on the fibers as the fibers are in a free-fall state. The preferred method of mixing the heat-fusible thermoset binding agent with the fibers is to spray the fibers with the heat-fusible thermoset binding agent as the fibers are free-falling into a mixing chute. The fibers and the dry heat-fusible thermoset binding agent are then mixed thoroughly in the mixing chute.

Suitable heat-fusible thermoset binding agents include phenol-formaldehyde resins, urea-formaldehyde resins, melamine-formaldehyde resins, and epoxy resins. The preferred heat-fusible thermoset binding agent is a phenol-formaldehyde resin, commonly called a phenolic resin. Phenolic resins are produced by condensing phenol and formaldehyde in the presence of an alkaline catalyst. When excess formaldehyde is used, the resin can be cured and set with heat to the thermoset stage. As used herein, the term "phenol" is intended to include phenol, cresol, resorcinol and mixtures thereof which are conventionally condensed in alkaline medium with an excess of formaldehyde to form a heat-curable phenolic resin.

A suitable phenolic resin for use in the present invention is that sold under the tradename Durite by Borden, Inc. of Columbus, Oh. A particularly suitable phenolic resin is that obtained from Borden under the name Durite 511A. Durite 511A comprises a phenol-formaldehyde copolymer, zinc stearate as a lubricating agent to assist in release of the molded product from the mold, and hexamethylenetetramine (1,3,5,7-tetraazatricyclo 3.3.1.13,7 decane) as a flowing agent.

Other ingredients may be added to or substituted for some of the phenol-formaldehyde copolymer of the phenolic resin. Such other ingredients include natural rosin, resin extenders such as Vinsol, or resin binders such as Gilsonite. Vinsol affects the flow characteristics of the resin and Gilsonite affects the cure rate of the resin. Other ingredients such as lubricants may also be added.

The phenolic resin should be dry and of a fine particle size so that even distribution of the resin in the fibers occurs. Good results have been obtained using a dry resin which has a particle size where 98% of the particles pass through a 200 mesh screen.

It is preferred to add the phenolic resin particles to the fibers by dry spraying it into the free-falling fibers from downwardly extending spray nozzles at a pressure of at least about 25–30 lb. in.$^2$ (about 2 kg/cm$^2$) and then thoroughly admixing the phenolic resin particles with the fibers.

Suitably, from about 5% to about 25% phenolic resin by weight of the molding preform is added to the fibers. It is preferred to add about 10% to about 20% and it is most preferred to add about 13%.

After the fibers have been admixed with the heat-fusible thermoset binding agent, the admixture is treated in a second step with a thermoplastic binding agent in order to secure the fibers to each other and to secure the heat-fusible thermoset binding agent to the fibers so that it remains uniformly distributed throughout the fibers.

A suitable means of applying the thermoplastic binding agent to the fibers and thermoset particles is to eject the fiber/thermoset particle admixture from a nozzle while, at the same time, spraying the thermoplastic binder solution onto the ejected admixture. The admixture with applied thermoplastic binder free-falls onto a moving flat belt below, thus forming a molding preform blanket. It is preferred that the fiber/thermoset admixture be ejected through the dispersion nozzle at a pressure above about 500 cfm and the most preferred pressure is about 766 cfm. During ejection of the fibers, the thermoplastic binding agent is sprayed onto the fibers, suitably at a pressure of about 6 lbs./in.$^2$ (about 0.4 kg/cm$^2$). The admixture ejection nozzle is preferably circular with a plurality of thermoplastic binder-applying spray nozzles positioned thereabout. The spray nozzles are preferably angled inward towards the axis of the admixture ejection nozzle to ensure thorough coating of the fiber/thermoset particle admixture with the thermoplastic binder. It is preferred to inwardly incline the spray nozzles at an angle of about 2° to 10° as measured between the axes of the spray nozzle and the ejection nozzle and it is most preferred to have the spray nozzles at an angle of about 5° to 7°.

The thermoplastic binding agent is suitably an aqueous starch solution with about 10% to about 20% starch solids content. Good results have been found using an aqueous starch solution made with corn starch at about 11% to about 15% solids content and best results have been found using a corn starch solution at about 14% solids content.

Other materials such as starch enzymes, fire retardants, and anti-microbial or anti-bacterial agents may also be added to the starch solution.

The starch solution may be heated before addition to the fibers. It is preferred that the starch solution be at a temperature of about 185° F. (about 85° C.).

The use of the thermoplastic binding agent as a means of binding the fibers together and of binding the heat-fusible thermoset binding agent to the fibers ensures that the molding preform is formed without using any of the heat-fusible thermoset binding agent to secure the fibers together. The heat-fusible thermoset binding agent is thus not needed for the formation of the molding preform but is available entirely for molding the molding product.

The molding preform has a density of about 1 to about 5 lbs/ft.$^3$ (about 16 to about 80 kg/m$^3$) and preferably the density is from about 2 to about 5 lbs./ft$^3$ (about 32 to about 80 kg/m$^3$). The molding preform preferably has a moisture content of less than about 15% and preferably less than about 12%. The molding preform is dried in a conventional dryer to a moisture content of less than about 5% before molding. The drying operation is preferably done at a temperature lower than the cure temperature of the heat-fusible thermoset binding agent so that all of the thermoset agent is available for the molding operation.

The three-dimensional molded product is formed by first cutting the molding preform to a desired size, and then molding the cut molding preform by application of heat and pressure. The dies of the mold plates of the molding machine conform to the desired end shape of the molded product. The molded product is molded in conventional manner at a sufficient pressure, temperature and time for the heat-fusible thermoset binding agent to cure and set the molded product. The molding parameters will vary depending on the particular heat-fusible thermoset binding agent used, the fiber content, thickness, and moisture content of the molding preform, and the die gap between the mold plates. Generally, the molding preform is molded at about 350°–400° F. (about 175°–200° C.) for about up to 3 minutes at a pressure of about 500 to 4000 psi (about 35 to about 280 kg/cm$^2$). When using wood fibers, Durite 511A as the heat-fusible thermoset binding agent, a molding preform about 3 inches thick and having a moisture content of about 5%, the molded product is made by molding the molding preform at about 350°–400° F. (about 175°–200° C.) for about 45 seconds at about 3,000 psi (about 200 kg/cm$^3$).

While the density of the molded product may be as high as desired, it is generally at least 2 times to about 30 times the density of the molding preform. The molded product may be formed having different densities over its structure, e.g. some portions may be 60 lbs./ft.$^3$ (960 kg/m$^3$) and some may be 40 lbs./ft.$^3$ (640 kg/m$^3$). The variations of the densities of the molded product may be obtained by varying the gap between the dies of the mold plates. When a lesser density is desired, a larger die gap is used. The pressure, temperature and time of the molding operation remain the same as for making a product with uniform density.

The present invention is more fully illustrated in the drawings wherein.

Figure 1:
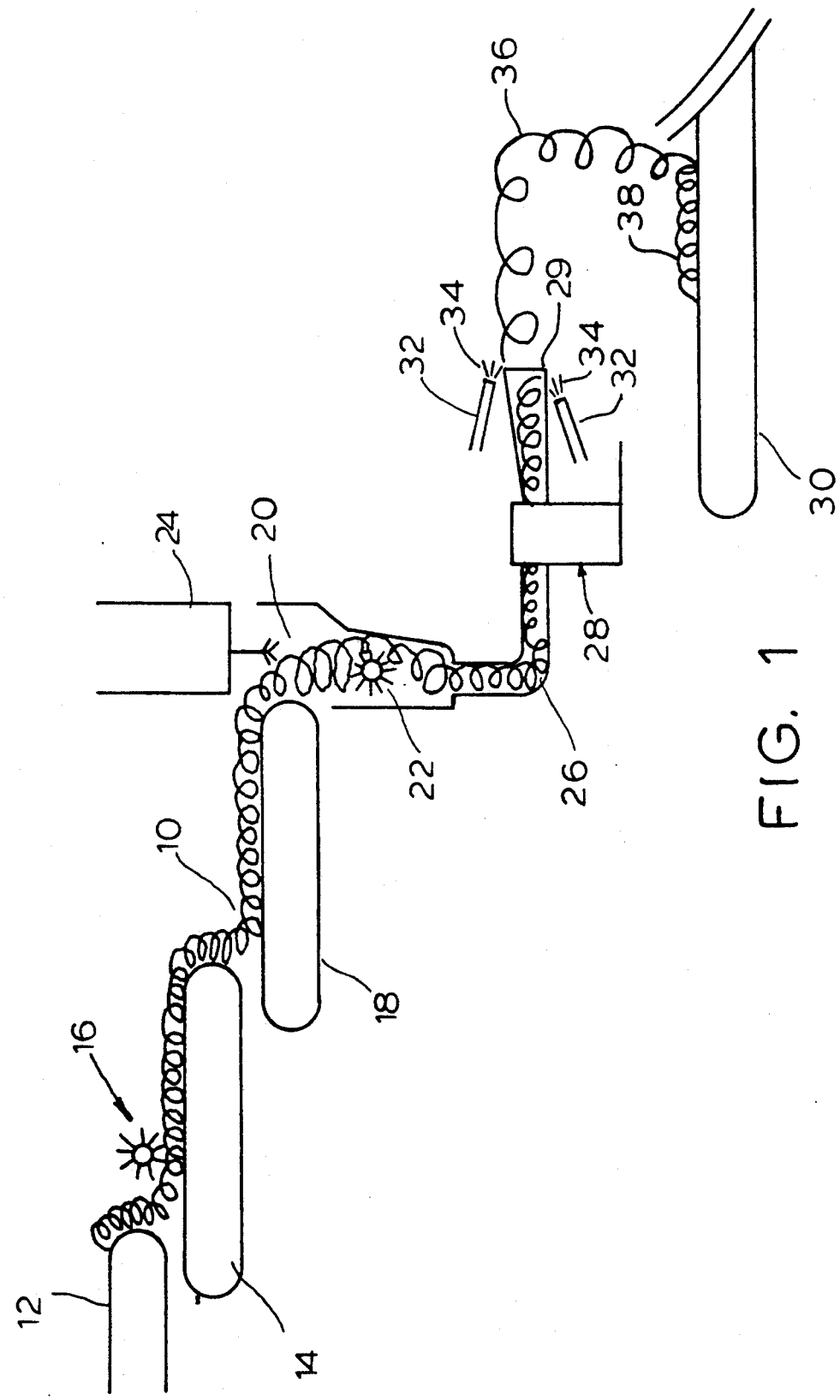
FIG. 1 shows an apparatus for making a molding preform.

Referring to FIG. 1, fibers 10 are continuously moved forward at a controlled rate from upper belt 12 to fall onto lower belt 14 with control paddle 16 for leveling the fibers and then onto weigh belt 18. Weigh belt 18 moves fibers 10 so the fibers fall into mixing chute 20. Particles of a dry heat-fusible thermoset binding agent are sprayed on the falling fibers through nozzle 24. The fibers and the heat-fusible thermoset binding agent are admixed in mixing chute 20 with mixing paddle 22. Pump 28 provides pressure so that the fibers/thermoset resin admixture 26 is ejected through ejection nozzle 29 under pressure. The admixture 26 is ejected from nozzle 29 onto moving preform screen 30. Thermoplastic binding agent 32 is sprayed on admixture 26 from spray nozzles 34 while admixture 26 is being ejected. The treated fibers 36 fall by gravity deposition onto preform moving screen 30 to form molding preform 38. After molding preform 38 is made, it is transferred from moving preform screen 30 to a dryer belt (not shown) of a dryer (not shown).

Figure 2:
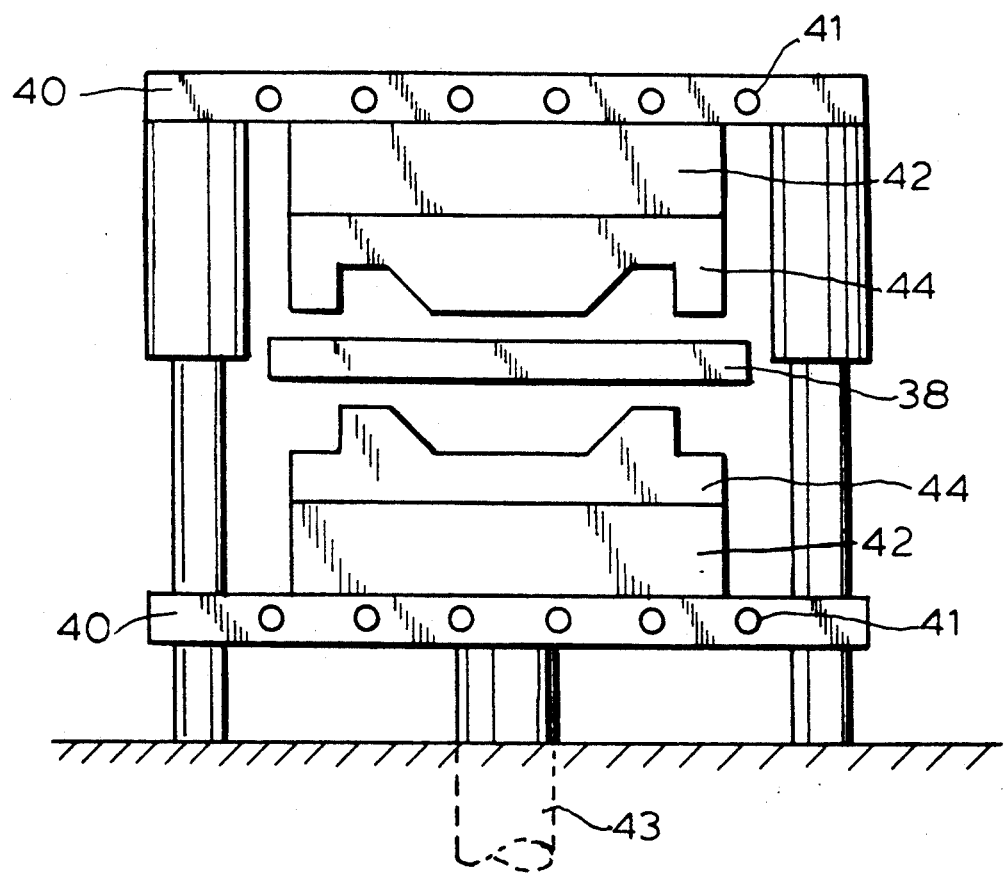
FIG. 2 shows an apparatus for forming a molded product from the molding preform.

FIG. 2 illustrates an apparatus for molding the dried molding preform 38. Molding preform 38 is cut to preliminary molding size by cutter means (not shown) and is then transferred to mold press 40. Mold press 40 has top and bottom mold plates 42, each having top and bottom dies 44. Mold press 40 also has a heating means 41 to heat mold plates 42 and hydraulic means 43 to move mold plates 42 together under pressure. Mold plates 42 apply heat and pressure simultaneously to molding preform 38 to form the molded product of the present invention.

These and other aspects of the present invention may be more fully understood with reference to the following example.

A molded product was made according to the present invention using yellow pine wood fibers, Durite 511 A as the heat-fusible thermoset binding agent and an aqueous corn starch solution as the thermoplastic binding agent.

Yellow pine fibers were degraded in a hammermill to a density of about 1 lb./ft.$^3$ (16 kg/m$^3$). The wood fibers were dispersed through a dispersion nozzle at a pressure of about 766 cfm to fall onto a moving belt. The belt transferred the fibers to a mixing chute having an impeller therein which rotates at about 3400 RPM. As the fibers fell into the mixing chute, the falling fibers passed under a series of 8 spray nozzles which sprayed dry Durite 511 A particles onto the fibers.

The Durite 511 A had the following composition:

| Ingredients | % by weight |
|---|---|
| Phenol-formaldeyde copolymer | 90 |
| Zinc Stearate | 1 |
| Hexamethylenetriamine | 9 |

16% Durite 511 A by weight of the fibers was sprayed onto the fibers.

These fibers and Durite 511 A were thoroughly admixed together and then the admixture was sprayed out of the mixing chute through an ejection nozzle at a pressure of 766 cfm. A starch solution comprising the following ingredients was sprayed onto the fibers as they were ejected:

| Ingredients | % by weight solution |
|---|---|
| Corn starch | 9.85 |
| Alphamase | 0.002 |
| Dearcide 702 | 0.04 |
| Ammonium Sulphate | 4.9 |
| Water | q.v. |

The corn starch was 550 B obtained from Clinton Corn Starch Company. Alphamase is a conventional starch enzyme. Dearcide 702 is a fungicide obtained from ChemTreat, Inc. Ammonium sulphate was added as a fire retardant.

The starch solution was made by first mixing the corn starch, alphamase and Dearcide with enough water to make a solution of 11% solids content. This solution was added to a blend tank. The ammonium sulphate was sifted slowly into the solution in the blend tank under agitation until completely dissolved. While agitating, the rest of the water was added. The final solids content of the starch solution was 14%. The solution was heated to gelatinize the starch and was then applied to the fibers in the heated form.

The starch was sprayed out of spray nozzles surrounding the ejection nozzle at a pressure of 55 psi. The spray nozzles were inclined inwardly towards the center axis of the ejection nozzle at an angle of about 5 to 7° as measured between the axes of the ejection nozzle and the spray nozzle.

The treated fibers fell onto a moving belt and formed a molding preform by gravity deposition. The molding preform was 3 inches (about 8 cm) thick and 140 inches (about 356 cm) wide with a density of about 2.2 lbs./ft$^3$. (about 35.2 kg/m$^3$). The moisture content of the molding preform was 35%.

The moving belt transferred the molding preform to a dryer where it was dried at a temperature of about 225° F. (about 107° C.) for 6½ minutes. After drying, the moisture content of the molding preform was less than 5%.

The molding preform was cut to a preliminary molding size and was molded in a conventional compression molding machine. The molding was done at a temperature of 400° F. (about 204° C.), a pressure of 3,000 psi and for a time of 45 seconds.

The physical properties of the finished molded product were measured and were found to be as follows:

Density: 62 lbs./ft$^3$. (about 993 kg/m$^3$)

Modulus of rupture: 5,000 psi

It will be understood that the claims are intended to cover all changes and modifications of the preferred embodiments of the invention herein chosen for the purpose of illustration which do not constitute departure from the spirit and scope of the invention.

What is claimed is:

1. A method for making a molded dimensional product comprising the steps of:
    (a) admixing fibrous material with dry particles of a heat-fusible thermoset agent to form a fiber/ thermoset particle admixture, the fibrous material being selected from the group consisting of wood, bleachboard, paper, textile fibers, and combinations thereof and the thermoset agent being a phenolic resin;
    (b) ejecting the admixture from an ejection nozzle and, as it is ejected, spraying the admixture with a solution of a thermoplastic binding agent, the thermoplastic binding agent being an aqueous starch solution;
    (c) allowing the sprayed admixture to free fall onto a substrate, thereby forming a molding preform;
    (d) drying the molding preform to a moisture content of less than about 5%;
    (e) cutting the molding preform to a desired size; and
    (f) applying heat and pressure to the molding preform to form a three-dimensional molded product.

2. The method of claim 1 wherein the treatment of the fiber/thermoset particle admixture with the thermoplastic binding agent is by spraying the thermoplastic binding through at least one spray nozzle which is inclined at an angle of about 2° to 10°, the angle being measured between the axes of the spray nozzle and the ejection nozzle.

3. The method of claim 2 wherein there are a plurality of spray nozzles arranged circularly about the ejection nozzle.

4. The method of claim 1 wherein the pressure applied in subpart (f) is sufficient to increase the density of molding preform by about 30 times.

5. A method for making a molded dimensional product comprising the steps of:
  (a) admixing fibrous material with dry particles of a heat-fusible thermoset agent to form a fiber/thermoset particle admixture;
  (b) ejecting said admixture from an ejection nozzle and, as it is ejected, treating said admixture with a solution of a thermoplastic binding agent;
  (c) allowing said treated admixture to free fall onto a substrate, thereby forming a molding preform;
  (d) cutting said molding preform to a desired size; and
  (e) applying heat and pressure to said molding preform to form a three-dimensional molded product.

6. The method of claim 5 wherein the fibrous material is selected from the group consisting of wood, paper, and textile fibers of cellulosic origin.

7. The method of claim 5 wherein the heat-fusible binding agent is a phenolic resin.

8. The method of claim 5 wherein the thermoplastic binding agent is an aqueous starch solution.

9. The method of claim 5 wherein the molding preform has a thickness of about 3 inches (about 7.5 cm) and the pressure applied is sufficient to reduce the molding preform from said thickness of about 3 inches (about 7.5 cm) to a thickness of about 1/10 inch (about 0.25 cm).

10. The method of claim 5 wherein the pressure applied is sufficient to increase the density of the molding preform by about 30 times.

11. The method of claim 5 wherein the pressure applied is from about 3,000 to about 5,500 psi.

12. The method of claim 5 wherein the treatment of the fiber/thermoset particle admixture with the thermoplastic binding agent is by spraying the thermoplastic binding through at least one spray nozzle which is inclined at an angle of about 2° to 10°, the angle being measured between the axes of the spray nozzle and the ejection nozzle.

13. The method of claim 5 wherein there are a plurality of spray nozzles arranged circularly about the ejection nozzle.

14. A method for making a molded dimensional product comprising the steps of:
  (a) admixing wood fibers with dry particles of a phenolic resin to form a fiber/resin particle admixture;
  (b) ejecting the admixture from an ejection nozzle and, as it is ejected, spraying the admixture with an aqueous starch solution through a plurality of spray nozzles circularly arranged about the ejection nozzle, the spray nozzles being inclined at an angle of about 5° to about 7°, the angle being measured between the axis of the spray nozzles and the ejection nozzle;
  (c) allowing the sprayed admixture to free fall onto a substrate, thereby forming a molding preform, the molding preform having a density of about 2 to about 3 lbs./ft³ (about 32 to about 48 kg/m³);
  (d) drying the molding preform to a moisture content of less than about 5%;
  (e) cutting the molding preform to a desired size; and
  (f) applying heat at a temperature of from 190° to about 205° C. and pressure at about 3,000 to about 4,500 psi for about 45 seconds to the molding preform to form a three-dimensional molded product having a density of from about 62 to about 70 lbs./ft³ (about 993 to about 1121 kg/m³).

15. A molded dimensional product made by the method of claim 1.

16. A molded dimensional product made by the method of claim 14.

* * * * *